United States Patent [19]

Gillespie

[11] 3,845,703

[45] Nov. 5, 1974

[54] CONTROLLING ARTICLE TOPPING AND ORIENTATION DETECTING

[75] Inventor: Robert M. Gillespie, Grand Rapids, Mich.

[73] Assignee: Sortex Company of North America, Inc., Lowell, Mich.

[22] Filed: Oct. 24, 1972

[21] Appl. No.: 300,428

[52] U.S. Cl.............. 99/491, 99/493, 99/636, 99/643, 209/111.6
[51] Int. Cl............................................ B26d 4/00
[58] Field of Search ............ 99/491, 493, 635, 636, 99/643; 56/121.4, 121.41, 121.42, 121.43, 56/121.44, 121.45, 121.46; 171/26, 29–42; 209/111.6; 83/73; 17/54

[56] References Cited
UNITED STATES PATENTS

| | | | |
|---|---|---|---|
| 2,565,727 | 8/1951 | Henderson | 241/37 X |
| 3,307,599 | 3/1967 | Vacca | 99/643 |
| 3,373,787 | 3/1968 | Tanos | 99/489 |

*Primary Examiner*—Harvey C. Hornsby
*Assistant Examiner*—Alan Cantor
*Attorney, Agent, or Firm*—McGarry & Waters

[57] ABSTRACT

Vegetable articles such as carrots have their tops removed as they are fed seriatim to a cutter which forces the vegetables against a fixed knife blade. The articles are checked for proper orientation for the cutting operation by a photometric sensing means which determines the color profile of the article as it is fed to the cutter. Upon a detection of the proper color profile for the vegetable, the cutter is activated to cut the vegetable when the same is in a proper position therefor. If the color profile detected is not proper, the cutter will not be activated and the vegetable will pass through the cutter without being cut thereby.

7 Claims, 6 Drawing Figures

CONTROLLING ARTICLE TOPPING AND ORIENTATION DETECTING

BACKGROUND OF THE INVENTION

This invention relates to topping or cutting the ends off of articles such as vegetables having a color profile indicative of its orientation. In one of its aspects, the invention relates to a method and apparatus for topping vegetables such as carrots. In another of its aspects, the invention relates to a method and apparatus for determining the orientation of an article having a color profile indicative of its orientation.

STATE OF THE PRIOR ART

In U.S. Pat. application of Robert Chapman, Ser. No. 299,925 entitled VEGETABLE ORIENTING AND CROWNING, filed of even date herewith and assigned to the same assignee of the present application, there is disclosed and claimed a method and apparatus for orienting elongated articles such as carrots, asparagus, celery and the like for feeding to a cutting mechanism which cuts the tops or crowns off the vegetables. Although the apparatus and method for orienting works effectively to orient the vegetables for the cutting operation, occassionally, an odd shape or size vegetable will not be properly oriented and will pass to the cutter improperly oriented. In cutting machines of the type disclosed in said copending patent application, the cutter assumes a predetermined orientation and will cut an end off the vegetable regardless of how the vegetable is oriented. If the vegetable is not properly oriented, the cutter will cut off a part of the vegetable and the uncrowned portion will fall into the bin with the crowned vegetables. If this improperly crowned vegetable is not detected, the crown will undesirably end up in some of the processed food.

It is therefore necessary that substantially 100% of the vegetables are properly oriented when passed to the cutting operation, or in the event that all such vegetables are not oriented, that the improperly oriented vegetables are not processed along with the oriented vegetables.

SUMMARY OF THE INVENTION

According to the invention, there is provided a method and apparatus for cutting ends off articles such as vegetables having a first color profile in one oriented condition and a second color profile in another oriented condition. Means are provided to cut the tops off the articles and means are provided to feed the articles seriatim to the cutting means. According to the invention, the color profile of the articles fed to the cutting means or zone is detected and the cutting means is activated responsive only to the detection of the first color profile by the detecting means. Desirably, means are provided to sense the presence of the vegetable at the cutter and for actuating the cutter responsive to the sensed presence of the article for cutting a leading end from the article. The detecting means desirably activates the sensing means to actuate the cutter means in the event that the first color profile is detected. Desirably, the profile of the article is photometrically detected as it passed to or toward the cutting means.

Also according to the invention, there is provided a method and apparatus for detecting the orientation of a vegetable having a first color profile in one orientation and a second color profile in another orientation. The vegetable is passed through a photometric detecting zone and there is generated therein a signal representative of the color intensity of each portion of said vegetable as it passes therethrough. The sequence and intensity of each of the signals generated is thereafter used to determine the orientation of the vegetable as it passes through the photometric zone.

BRIEF DESCRIPTION OF THE DRAWINGS

The invention will now be described with reference to the accompanying drawings in which.

DESCRIPTION OF THE PREFERRED EMBODIMENTS

First Embodiment

Figure 1:
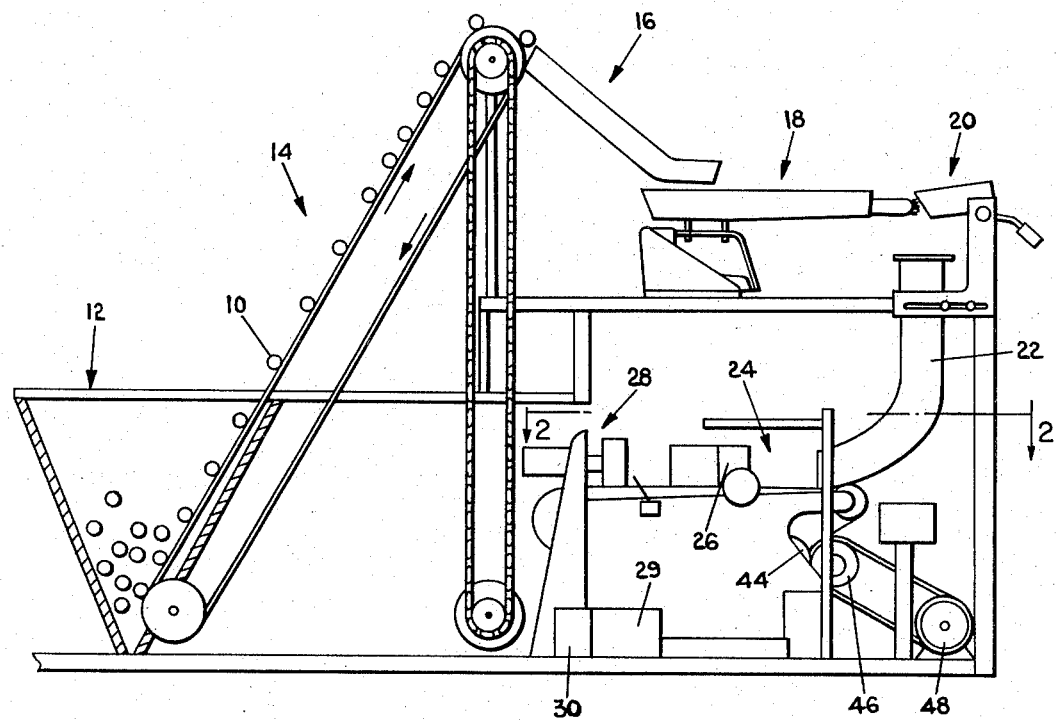
FIG. 1 is a side elevational schematic view of an apparatus according to the invention.

Referring now to the drawings and to FIG. 1 in particular, there is illustrated an apparatus for orienting and crowning carrots. The apparatus includes a hopper 12 into which the carrots are initially fed and an elevator 14 passing through the hopper and lifting carrots 10 from the hopper 12 upwardly to dump the same onto a straightening chute 16. A vibratory feeder tray 18 is positioned beneath the straightening chute 16 to receive carrots therefrom and to feed the same to a carrot orienting mechanism 20. Carrots are oriented by the orienting mechanism 20 so that the crown or top end thereof falls first as the leading end down a feed chute 22 and are deposited onto a conveyor mechanism 24. A color sensing apparatus 26 is positioned along the conveyor 24 to view the carrots as they pass therealong. A crowning mechanism 28 is provided at the end of the conveyor to cut off the tops or crowns which are properly oriented on the conveyor.

Figure 2:
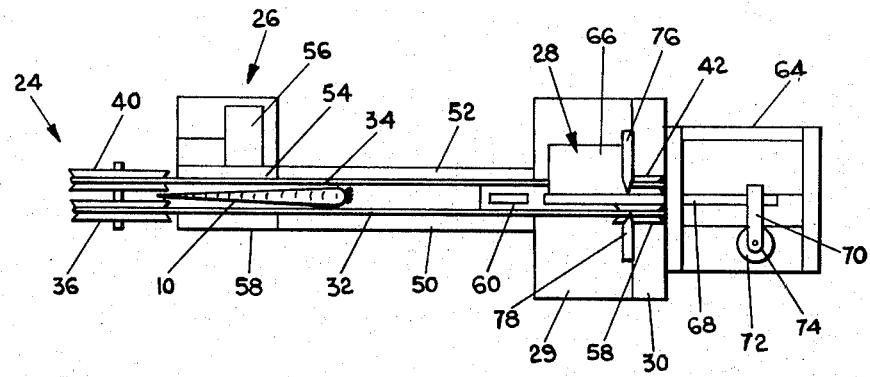
FIG. 2 is a plan view taken along lines 2—2 of FIG. 1.
Figure 3:
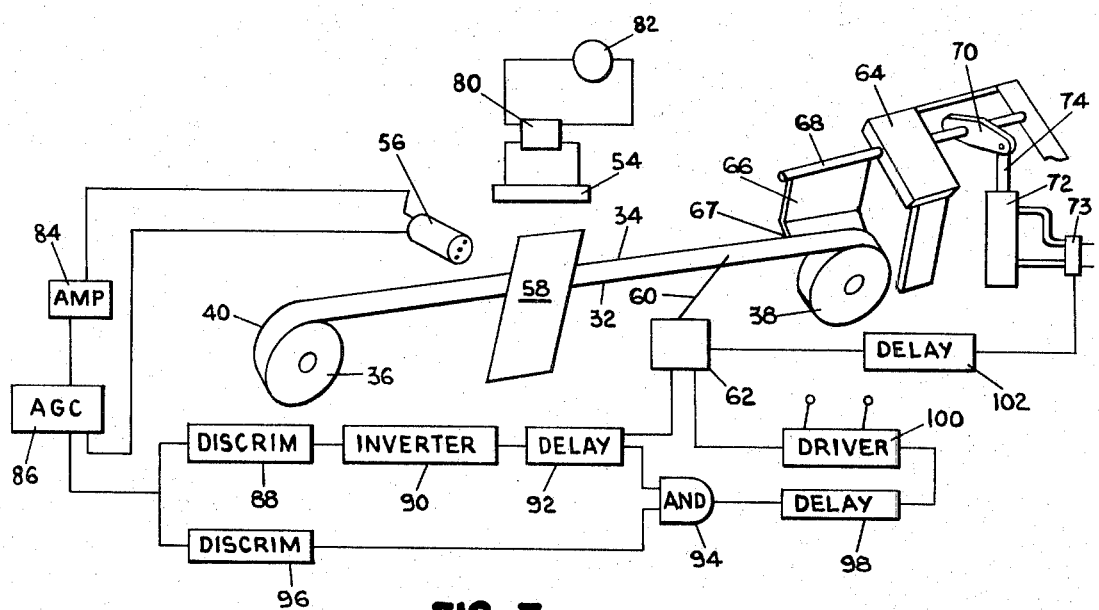
FIG. 3 is a schematic view of a control system according to the invention.

Referring now to FIGS. 2 and 3, the conveyor 24 comprises a pair of continuous belts 32 and 34 in spaced relationship to each other for receiving the carrots 10. Belt 32 is wound around pulley wheels 36 and 38 on an upper run and around a pulley wheel 44 (FIG. 1) at a lower run. Similarly, continuous belt 34 is positioned on pulley wheels 40 and 42 at an upper run and around a pulley wheel 44 at a lower run. The continuous belts 32 and 34 pass around and are in contact with a pair of pulley wheels 46 (only one shown in FIG. 1) which are driven by a motor 48 in a conventional manner.

A pair of guide members 50 and 52 are positioned at each side of the conveyor to retain the carrots thereon. A light source 54 is positioned above the conveyor at the color sensing apparatus 26 to illuminate the same. The light source can, for example, be a flourescent light which is cycled at, for example, 60 cycles per second. As illustrated in FIG. 3, the light source 54 is powered by an alternator 80 which for example may be an oscillator, connected to a power source 82.

The color sensing apparatus 26 includes a photomultiplier tube 56 at one side of the conveyor 24 and a background plate 58 on the other side of the conveyor across from the photomultiplier tube for viewing thereby. The background plate 58 has a color surface viewed by the photomultiplier tube. The color surface is of an intermediate shade between the extremes of the carrot.

A switch actuation finger 60 projects up from beneath the conveyor from a switch 62. The actuation finger 60 is positioned between the continuous belts 32 and 34 near the carrot crowning mechanism for contact with the carrots as the carrots are driven along the conveyor. The switch 62 is tripped by the carrots 10 as they pass along the conveyor and contact the switch actuation finger 60.

The carrot crowning mechanism 28 comprises a frame 64 which rotatably supports a shaft 68. A pusher plate 66 having a protuberance 67 at the bottom thereof is mounted on the shaft 68 for movement therewith. A link 70 is secured to the shaft 68 at one end and, at the other end, is pivotably mounted on the outer end of an extendible rod 74 of a power cylinder 72. Flow of fluid pressure to the power cylinder to actuate the extendible rod 74 is controlled by a valve 73. A pair of blades 76 and 78 are mounted at either side of the conveyor 24 adjacent to the pusher plate 66 for cutting off the crowns or tops of the carrots as they are pushed laterally by the pusher plate 66. A bin 29 is positioned beneath the conveyor and on either side thereof at the carrot crowning mechanism 28 to receive the carrots which have been crowned. A second bin 30 is provided adjacent the bin 29 and on the other side of the knife blades 76 and 78 to catch the crowns of the carrots.

The photodetector 56 has an output applied to an amplifier 84. An automatic gain control 86 is coupled to the output of amplifier 84 and feeds back a signal to the photodetector 56. The automatic gain control 86 stabilizes the amplifier output by feedback to the photodetector at a predetermined voltage value based on pulse inputs. The gain is stabilized by pulses representing the light values sensed by the photodetector 56 during those periods of time in which the light source 54 is off. The automatic gain control 86 can be any suitable circuit which automatically controls the gain of the photodetector which receives a pulsed light input, the pulses of which may vary in amplitude. An example of such a system is disclosed and claimed in the U.S. Pat. No. 3 439 172 to Chapman,.

The output from the automatic gain control 86 is applied to a first discriminator 88 which filters out the reference pulse signals. The output of the discriminator 88 is inverted in inverter 90 and the inverted signal is applied to a delay circuit 92 and then to AND gate 94. The output from the automatic gain control 86 is also applied to a second discriminator 96 which also filters the pulsed dark reference signals from the output signal. The output from the second discriminator 96 is applied to another input of AND gate 94.

The first discriminator 88 is set to produce an output signal at a relatively low level of input signal. The second discriminator 96 is set to produce an output signal when the input signal is at a relatively high amplitude. High and low amplitudes refer to light values sensed by the photodetector 56. A high amplitude would be produced by a relatively light subject such as a carrot. The low amplitude pulses would be produced by relatively dark subjects, such as the green top of the carrot. Desirably, the discriminator 88 is set to be on normally when the background 58 is being viewed by the photodetector 56. The second discriminator 96 is set to be off when the background 58 is viewed by the photodetector 56 but will be turned on when a brighter object such as a carrot passes in front of the photodetector 56.

The output from the AND gate 94 is applied to a driver 100 through a delay 98. The driver 100 supplies power to the switch 62.

Operation

The control system operates as follows: Carrots are delivered to the conveyor 24 by the feed chute 22. In nearly all cases, the carrots will be oriented with their crown end as the leading end of the carrots as they pass on to the continuous belts 32 and 34. The carrots will be conveyed past the photodetector 56 as they travel down the conveyor towards the crowning mechanism 28. Before the carrot arrives at the photodetector 56, the output from the photodetector will be at a level indicative of the background plate 58. As set forth above, the background plate 58 is set at a color level between the dark green of the crown of the carrot and the orange of the carrot body. Typically, the photodetector 56 will be provided with an orange filter so that the crown of the carrot appears dark or black, the body of the carrot appears white, and the background 58 appears gray.

When the photodetector 56 senses the background 58, the discriminator 88 will be on, applying a positive, for example, signal to inverter 90 which inverts the discriminator signal and applies the inverted signal to AND gate 94. At the background level no signal would be applied to the AND gate 94 from discriminator 96. The delay 92 is set to delay the signal applied thereto a short time to permit movement of the carrot from a position with its crown directly in front of the photodetector 56 to a position past the photodetector 56, normally where the body of the carrot would be in front of the photodetector 56. At the time when no carrot is present in front of the photodetector 56, the discriminator 96 would be off and no signal would be applied to the AND gate 94 from the discriminator 96. Thus, when no carrot is in front of the photodetector 56, the AND gate will be off and thus no signal will be applied to the driver 100. The driver requires a signal from the delay 98 before supplying power to the switch 62.

As a properly oriented carrot passes in front of the photodetector 56, the crown end of the carrot will be sensed by the photodetector. This will produce a dark output pulse which will be applied to the discriminator 88 and the discriminator 88 will thereby be turned off. The inverter 90 will be turned on and apply a signal to the AND gate 94 after a slight delay. At this time, the discriminator 96 will be off and no signal will be applied therefrom to AND gate 94 and thus AND gate 94 is off. However, as the body of the carrot passes in front of the photodetector 56, the discriminator 96 will be turned on and apply a signal to the AND gate 94. The signal from the inverter 90, having been delayed by the delay 92, is thus applied to the AND gate 94 simultaneously with the signal from the discriminator 96. The AND gate is thereby turned on to operate the driver 100 after a delay. The delay 98 is set to delay the signal from the AND gate a sufficient time to permit the carrot to pass from the photodetector 56 to the switch 60. The delay 98 also holds on the driver 100 for a predetermined length of time to permit the carrot to pass from the photodetector 56 to the switch actuator finger 60. As the carrot trips the switch actuator 60, a signal will be applied to the delay 102 which delays the signal a sufficient time to permit the crown of the carrot to reach the knife blades 76 and 78. The signal is then applied to the valve 73 which changes the flow of fluid pressure to the cylinder 72 to cause the rod 74 to extend or retract. For example if the rod is in the position illustrated in FIG. 3, the rod 74 will be extended to rotate the shaft 68 to push the carrot toward the knife blade 78. During this operation, the crown of the carrot will be to the right of knife blade 78 as viewed in FIG. 2, and the body of the carrot will be to the left of the knife blade 78. The forcing of the carrot against the knife blade 78 will sever the crown from the body of the carrot, whereupon the carrot will drop into the bin 29 and the crown of the carrot will drop into the bin 30.

In the event that, for some reason, the carrot is oriented with its bottom end first on the conveyor, then the switch 62 will not be activated so that the carrot crowning mechanism 28 will not operate. The carrot then just passes off the end of the conveyor 26 and is recycled to the operation. The color sensing system works as follows when an improperly oriented carrot is present on the conveyor 24: As the carrot passes in front of the photodetector 56, the body of the carrot will first be sensed thereby and will eventually turn on the discriminator 96. However, at this time, the discriminator 88 is also on and the inverter 90 then applies through the delay 92 no signal to the AND gate 94. Although a signal is applied from the second discriminator 96 to the AND gate 94, and the AND gate will be off since only one signal is received thereby. As the crown of the carrot passes the photodetector 56, the discriminator 88 will be turned off, the inverter 90 will output a signal through delay 92 and to AND gate 94. However, at the time the delayed signal reaches the AND gate 94, discriminator 96 will be off and no signal will be applied therefrom to AND gate 94 and the AND gate 94 will remain off. Thus, no signal is applied to the driver 100 and the switch 62 remains off. When the carrot passes over the actuator finger 60, no response will take place in the switch 62 and thus the cylinder 72 will not be activated to rotate the rod 68.

Normally, the cylinder moves the extendible rod either up or down during any given crowning operation. For example, after the extendible rod 74 has been moved up during one crowning cycle, it remains in that position until the next properly oriented carrot is positioned for crowning. Then, the extendible rod 72 is pulled downwardly, thereby forcing the carrot against the knife blade 76 to cut off the crown.

Second Embodiment

Figure 5:
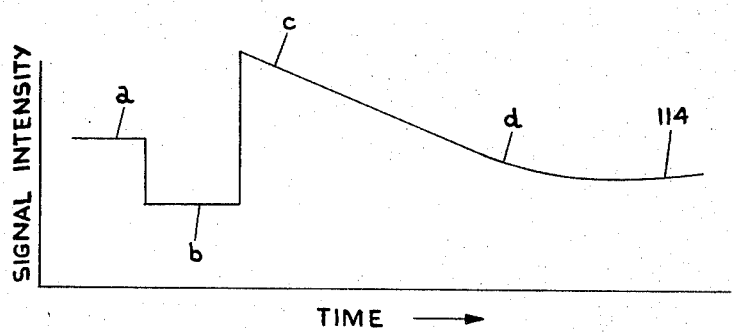
FIG. 5 is a graph illustrating a wave form obtained by the control circuit of the apparatus illustrated in FIG. 4.
Figure 4:
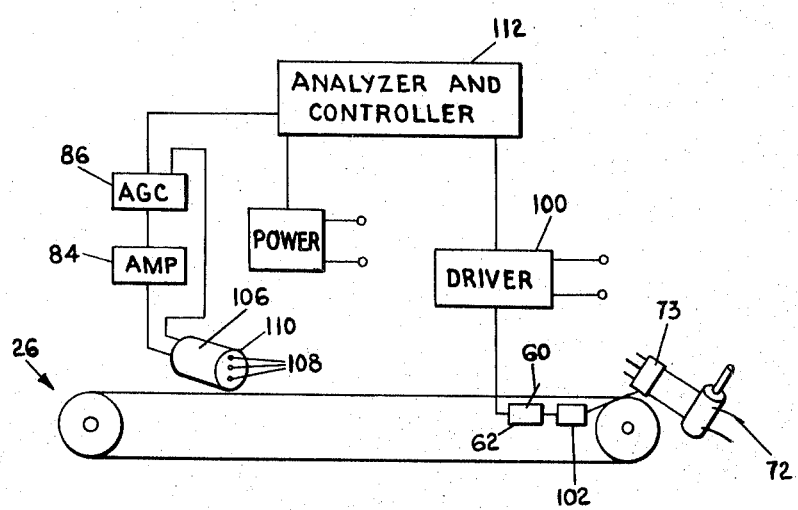
FIG. 4 is a schematic view of a modified form of the invention.
Figure 6:
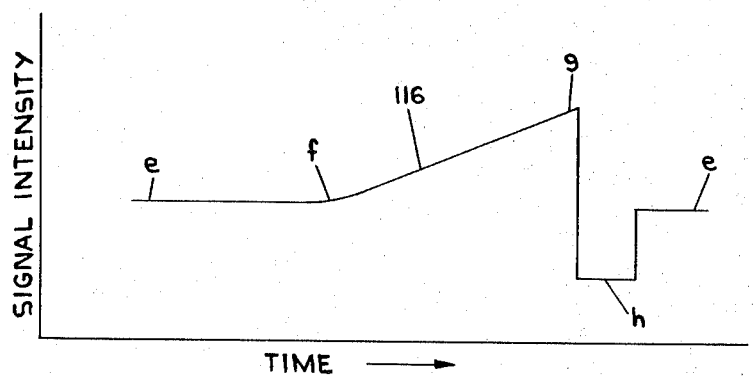
FIG. 6 is a graph of a second wave form obtained in the control circuit of the apparatus illustrated in FIG. 4.

Reference is now made to FIGS. 4 – 6 for a description of the second embodiment of the invention. In FIG. 4, like numerals have been used to designate like parts. The analyzer control system comprises a photomultiplier scanner 106 having a plurality of holes 108 vertically spaced on a front plate 110 thereof. The output from the scanner is applied to an amplifier 84 and an automatic gain control 86 which stabilizes the output voltage from the photomultiplier scanner 106. The output from the analyzer and controller 112 is applied to a driver 100 which is coupled to a switch 62. This switch operates in the same manner as the corresponding switch in the first embodiment illustrated in FIG. 3 and controls the valve 73 for the cylinder 72 whenever the actuator finger 60 is depressed and power supplied to the switch 62.

The analyzer and controller synthesizes the output signal from the photomultiplier scanner to detect the profile of the article passing along the conveyor 26. For example, a properly oriented carrot would have a wave form 114 such as illustrated in FIG. 5. In the wave form 114, the intensity level $a$ represents the background level before the carrot passes in front of the photomultiplier scanner 106. As the crown of the carrot passes the scanner, the intensity will drop to level $b$. The intensity will then rise to level $c$ as the body of the carrot begins to pass the photomultiplier scanner 106. The wave form 114 will show a downwardly sloping line to a point $d$ as the carrot continues to pass in front of the photomultiplier scanner 106. When wave form 114 is seen by the analyzer and controller, it turns on the driver 100 which applies the power to switch 62. Thus, as the carrot passes over the actuator finger 60 of switch 62, a signal will be sent after a delay in delay 102 to the valve 73 to operate the cylinder 72 in a manner described above.

In the event that the carrot is improperly oriented, i.e., with the bottom end or small end as the leading end, the wave form 116 illustrated in FIG. 6 will be analyzed by the controller 112. Thus, the wave form has an intensity $e$ when the background is being viewed. As the carrot passes in front of the photomultiplier scanner 106 the intensity level will rise from a level $f$ to a level $g$ in an upwardly sloping manner. The level of intensity of the signal will then drop to level $h$ as the crown of the carrot passes the scanner 106 and then will rise to the level $e$ as the background is again viewed by the scanner 106. When the wave form 116 is received by the analyzer and controller 112, no power will be supplied to driver 100 and switch 62 will remain inactive. The improperly oriented carrot passing along the conveyor 26 will thus pass off the end of the conveyor and be recycled to the orienting operation.

The invention described above provides a method and means for ascertaining the proper orientation of an article before an end thereof is removed. By the use of the invention, the cutting of improperly oriented articles with the attendant contamination of food products with undesirable tops is eliminated.

As used throughout the specification and claims, the term "color profile" is intended to designate the intensity of one or more colors of a plurality of segments of a given article as it passes a given point. Thus, color profile refers to the dark-light sequences of the first embodiment as well as the decreasing intensity wave form of the second embodiment. As used herein, "color" is intended to designate the spectral colors as well as black and white.

Reasonable variation and modification are possible within the scope of the foregoing disclosure, the drawings, and the appended claims without departing from the spirit of the invention.

The embodiments of the invention in which an exclusive property or privilege is claimed are defined as follows:

1. An apparatus for cutting the ends off articles having a first color profile in one oriented condition and a second color profile in a second oriented condition, said apparatus including a cutter means operable to cut an end off an article responsive to the presence of the article at the cutter means, and means for feeding said articles seriatim to said cutter means, the improvement which comprises:

means for detecting the color profile of said article on said feeding means; and
   means for actuating said cutter means to cut an end off said article responsive only to the detection of said first color profile by said detecting means.

2. An apparatus according to claim 1 and further comprising means to sense the presence of an article at said cutter means and means for operating said cutter means responsive to the sensed presence of said article, said actuating means activating said sensing means responsive only to the detection of said first color profile.

3. An apparatus according to claim 2 wherein said presence sensing means includes a probe positioned in the path of said articles and switch means operated by said probe, said switch means being coupled to said cutter means.

4. An apparatus according to claim 1 wherein said color profile detecting means comprises a photoelectric cell and a filter for one color of said article, and said color profile is a dark and light sequence as said article passes said detecting means.

5. An apparatus according to claim 3 wherein said feeding means includes a conveyor and said detecting means is positioned alongside of said conveyor to detect said color profile as said article passes thereby.

6. An apparatus according to claim 1 wherein said cutter means includes a pusher member positioned for movement across the path of said article, and a knife blade fixed at at least one side of said path in cooperative relationships with said pusher member to cut said article when the same is pushed against said knife blade.

7. An apparatus according to claim 1 wherein said feeding means includes a conveyor and said detecting means is positioned alongside of said conveyor to detect said color profile as said article passes thereby.

* * * * *